(12) United States Patent
Girelli Consolaro et al.

(10) Patent No.: US 10,807,426 B2
(45) Date of Patent: Oct. 20, 2020

(54) MULTI-LINK SUSPENSION FOR A MOTOR VEHICLE

(71) Applicant: FORD GLOBAL TECHNOLOGIES, LLC, Dearborn, MI (US)

(72) Inventors: Alberto Girelli Consolaro, Aachen NRW (DE); Paul Zandbergen, Wuerselen NRW (DE); Daniel Mainz, Herzogenrath NRW (DE); Friedrich Peter Wolf-Monheim, Aachen NRW (DE); Thomas Gerhards, Niederzier NRW (DE); Ralf Hintzen, Aachen NRW (DE); Rainer Souschek, Aachen NRW (DE); Brian Chen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 16/142,429

(22) Filed: Sep. 26, 2018

(65) Prior Publication Data

US 2019/0092113 A1 Mar. 28, 2019

(30) Foreign Application Priority Data

Sep. 27, 2017 (DE) .................. 10 2017 217 190

(51) Int. Cl.
*B60G 3/20* (2006.01)
*B60G 11/08* (2006.01)

(52) U.S. Cl.
CPC .............. *B60G 3/20* (2013.01); *B60G 11/08* (2013.01); *B60G 2200/14* (2013.01);
(Continued)

(58) Field of Classification Search
CPC .. B60G 3/20; B60G 11/08; B60G 2206/7101; B60G 2200/14; B60G 2200/18; B60G 2202/114; B60G 2204/121
See application file for complete search history.

(56) References Cited

U.S. PATENT DOCUMENTS

| 1,546,711 A * | 7/1925 | Brock ................. B60G 11/08 267/244 |
| 6,378,881 B2 | 4/2002 | Stenvall |

(Continued)

FOREIGN PATENT DOCUMENTS

| DE | 102014206772 A1 | 10/2015 |
| DE | 102014215872 A1 | 2/2016 |

(Continued)

*Primary Examiner* — Drew J Brown
(74) *Attorney, Agent, or Firm* — Raymond L. Coppiellie; Brooks Kushman P.C.

(57) ABSTRACT

The invention relates to a multi-link rear suspension for a motor vehicle, having at least one transverse leaf spring arranged on the motor vehicle to extend in the transverse vehicle direction and having ends which operatively act on left and right wheel carriers to cushion a vehicle structure of the motor vehicle with respect to the wheel-carriers. The transverse leaf spring also serves as a stabilizer, thereby replacing dedicated stabilizer. In order to provide a multi-link rear suspension which is optimized in terms of structural space and which is lightweight, the multi-link rear has exclusively transverse links for guiding the wheel-carriers.

14 Claims, 6 Drawing Sheets

(52) U.S. Cl.
CPC .... *B60G 2200/18* (2013.01); *B60G 2202/114* (2013.01); *B60G 2204/121* (2013.01); *B60G 2206/7101* (2013.01)

(56) References Cited

U.S. PATENT DOCUMENTS

| | | | |
|---|---|---|---|
| 6,390,486 B1 | 5/2002 | Boes et al. | |
| 6,457,729 B2 * | 10/2002 | Stenvall | B60G 3/06 280/124.134 |
| 9,073,400 B2 * | 7/2015 | Perri | B60G 11/08 |
| 9,162,546 B2 | 10/2015 | Girelli et al. | |
| 2002/0000703 A1 * | 1/2002 | Lawson | B60G 3/18 280/124.1 |
| 2002/0043780 A1 * | 4/2002 | Sandahl | B60G 3/20 280/124.135 |
| 2014/0353937 A1 * | 12/2014 | Girelli Consolaro | B60G 3/20 280/124.128 |
| 2016/0339753 A1 * | 11/2016 | Wallgren | B62D 7/14 |

FOREIGN PATENT DOCUMENTS

| | | | |
|---|---|---|---|
| JP | 07246817 A * | 9/1995 | |
| WO | 2009028942 A1 | 3/2009 | |

* cited by examiner

MULTI-LINK SUSPENSION FOR A MOTOR VEHICLE

CROSS-REFERENCE TO RELATED APPLICATIONS

This application claims foreign priority benefits under 35 U.S.C. § 119(a)-(d) to DE Application 10 2017 217 190.1 filed Sep. 27, 2017, which is hereby incorporated by reference in its entirety.

TECHNICAL FIELD

The invention relates to a multi-link rear suspension for a motor vehicle, having at least one transverse leaf spring extending in the transverse direction of the motor vehicle, for cushioning a vehicle structure of the motor vehicle with respect to wheel-carriers of the multi-link rear suspension, wherein the transverse leaf spring is also constructed as a stabilizer. Furthermore, the invention relates to a motor vehicle having a multi-link rear suspension.

BACKGROUND

A motor vehicle may be provided with a multi-link rear suspension which forms a single-wheel suspension for each rear wheel. Each single-wheel suspension has a wheel-carrier, on which the respective rear wheel is rotatably mounted, and a plurality of links which are connected to the respective wheel-carrier. Generally, a multi-link rear suspension additionally has a stabilizer which counteracts rolling movements of the motor vehicle in order to improve the travel dynamics of the motor vehicle.

In order to cushion a vehicle structure (sprung weight) of the motor vehicle there is generally arranged on each single-wheel suspension a coil spring (sometimes and airspring) which is in compression between the vehicle structure and a spring plate which is at least indirectly connected to the respective wheel-carrier. In addition, there is arranged on each single-wheel suspension at least one oscillation damper, also referred to as a shock absorber, by means of which oscillations of the vehicle structure with respect to the respective wheel-carrier can be damped. The oscillation damper may be supported, at a first end, on the vehicle structure and, at the other end, at least indirectly on the respective wheel-carrier.

Among other publications disclosing a motor vehicle suspension employing a transverse leaf spring are: DE 10 2013 210 338; DE 10 2014 215 872 A1; U.S. Pat. No. 9,073,400 B2; DE 10 2014 206 772 A1; U.S. Pat. No. 6,378,881 B2; U.S. Pat. No. 6,457,729; and WO 2009/028942 A1.

SUMMARY

The disclosed arrangement of components provides for a motor vehicle multi-link rear suspension which is optimized in terms of structural space and which is lightweight.

It should be noted that the features and measures set out individually in the following description can be combined with each other in any technically advantageous manner and set out other embodiments of the invention. The description additionally characterizes and specifies the invention in particular in connection with the Figures.

The multi-link rear suspension disclosed herein does not use any longitudinal links or control links in order to guide the wheel-carriers. Instead, the wheel-carriers are exclusively guided by means of transverse links. In addition, there is also no guiding of the wheel-carriers by means of the transverse leaf spring since the wheel-carriers are guided exclusively by means of the transverse links and the transverse leaf spring is used to cushion the vehicle structure with respect to the wheel-carriers and also serves as or replaces a stabilizer.

As a result of the exclusive use of transverse links to guide the wheel-carriers, there are also produced in comparison with the use of a longitudinal link rear suspension in addition to travel dynamic differences above all structural space advantages with respect to the arrangement of other subassemblies below the vehicle floor, such as, for example, battery packs of electric vehicles or hybrid electric vehicles. In addition, a longitudinal link generally requires a cut-out on the vehicle structure in order to be able to receive a structure-side bearing by means of which the longitudinal link is articulated to the vehicle structure. This weakens the vehicle body structure or bodywork structure at this location which either leads to a worsening of the "Noise, Vibration, and Harshness" (NVH) behavior, the deformation behavior or the like, which must be compensated for by means of weight-adding reinforcements. These disadvantages do not occur with the multi-link rear suspension disclosed herein since longitudinal links are dispensed with.

Since with the multi-link rear suspension disclosed herein there is also no guiding of the wheel-carriers by means of the transverse leaf spring (the transverse leaf spring is not arranged and used for this purpose), there are produced (in comparison with a use of the transverse leaf spring to guide the wheel-carriers) a different mechanical loading of the transverse leaf spring and a different travel behavior of the motor vehicle. As a result of the mechanical decoupling of the guiding of the wheel-carriers from the cushioning of the vehicle structure as per the multi-link rear suspension disclosed herein, on the one hand, the kinematic properties of the multi-link rear suspension and, on the other hand, the suspension properties and stabilizer properties of the multi-link rear suspension can be adjusted or configured separately from each other. In contrast, with a guiding of the wheel-carriers by means of the transverse leaf spring, a modification of the kinematic properties of the multi-link rear suspension will also influence the suspension properties and stabilizer properties of the multi-link rear suspension and vice versa.

The transverse leaf spring can be produced in an integral or monolithic manner or be composed of two or more resilient elements which are connected to each other, in particular leaf spring elements. The transverse leaf spring may be supported directly or indirectly on the vehicle structure or fixed thereto. The transverse leaf spring may be indirectly or directly connected to the wheel-carriers of the multi-link rear suspension. The transverse leaf spring is in the disclosed multi-link rear suspension primarily loaded with vertical loads. Lateral loads and longitudinal loads, in contrast, are absorbed by the transverse links and the transverse link bearing bushes. Therefore, the transverse leaf spring reacts to bending forces primarily as desired.

For guiding the wheel-carriers, the multi-link rear suspension may have for each wheel-carrier five transverse links which all extend substantially in the transverse vehicle direction. The multi-link rear suspension may additionally have an auxiliary frame which is connected to the wheel-carriers by means of the transverse links. Two upper transverse links of each wheel suspension may extend above a wheel rotation axis defined by the respective wheel-carrier, wherein a forward-upper transverse link thereof may be arranged, with respect to a longitudinal vehicle center axis of the motor vehicle, offset forward with respect to the wheel rotation axis and the additional rear-upper transverse link may be arranged offset rearward with respect to the wheel rotation axis. Furthermore, two lower transverse links of each wheel suspension of the multi-link rear suspension may extend below the wheel rotation axis defined by the respective wheel-carrier, wherein a forward-lower transverse link thereof may be arranged, with respect to the longitudinal vehicle center axis of the motor vehicle, offset forward with respect to the wheel rotation axis and the additional rear-lower transverse link may be arranged offset rearward with respect to the wheel rotation axis. A fifth transverse link of the multi-link rear suspension acts as a tie rod or toe link which can be arranged offset laterally or rearwardly with respect to the wheel rotation axis which is defined by the respective wheel-carrier. Alternatively, the toe link may be arranged forward of the wheel rotation axis.

The transverse leaf spring replaces conventional coil springs and a conventional stabilizer and takes over the functions of both of these components. Alternatively, only one conventional coil spring can also be replaced and the function thereof can be taken over. The conventionally usual connection of a coil spring to a lower transverse link requires in most cases a bent construction of the remaining transverse links of the same wheel suspension in order to provide sufficient structural space for the coil spring. However, the bent construction of a transverse link is linked with a higher weight of the link, higher costs and a lower rigidity of a transverse link. In addition, the transverse link on which the coil spring is supported, as a result of the spring pocket which is formed thereon, has a relatively low level of rigidity, which impairs the travel behavior, in particular the steering sensation which is connected therewith. Furthermore, the resilient force of the coil spring may not act on a longitudinal axis of the transverse link connected to the coil spring, whereby there are produced torques which impair the NVH behavior. The guiding of a conventional stabilizer around components of a multi-link rear suspension which is provided with coil springs, in particular around the respective coil spring, is in most cases relatively complex, whereby the functional capability of the stabilizer may be impaired. Furthermore, the stabilizer, the coil springs and the mechanical means which are used for the assembly of these components, such as, for example, clamps, increase the weight of a multi-link rear suspension. All these disadvantages are avoided by the replacement of the coil springs and the stabilizer by the transverse leaf spring disclosed herein. In particular, the transverse link on which the coil spring is conventionally supported can be configured in a structurally simpler manner since no spring pocket for the coil spring has be constructed thereon. This transverse link thereby has a lower weight, a higher level of rigidity and can be produced at a lower cost. The remaining transverse links can also be positioned in a more advantageous manner without the coil springs and, for example, be constructed in a linear manner.

The motor vehicle may, for example, be a passenger vehicle or a utility vehicle. In particular, the motor vehicle may be an electric or a hybrid electric vehicle, wherein, as a result of the exclusive use of transverse links to guide the wheel-carriers, as described above, a larger structural space is available for a traction battery of the motor vehicle.

According to an advantageous embodiment, the multi-link rear suspension has at least two securing units which engage in a manner spaced apart from each other on the transverse leaf spring and via which the transverse leaf spring can be secured at two positions which are arranged symmetrically relative to a longitudinal vehicle center axis to the vehicle structure or an auxiliary frame of the multi-link rear suspension which can be secured thereto. The transverse leaf spring may be supported in an uninterrupted manner or only in the event of loading via the securing units on the vehicle structure or auxiliary frame and can be fixed by means of the securing units in the direction of the longitudinal extent thereof in a non-movable manner on the vehicle structure or the auxiliary frame. Each securing unit may have at least one damping member, for example, produced from an elastomer material, in order to decouple the transverse leaf spring acoustically to the greatest possible extent from the vehicle structure or the auxiliary frame. A portion of the transverse leaf spring located between the securing units moves vertically during spring operations. This vertical displacement of the portion of the transverse leaf spring has to comply with specific free space requirements for additional vehicle components. For example, a free space which is required for an exhaust gas system should remain free below the vehicle floor and not be taken up by the vertically displaced transverse leaf spring portion.

Another advantageous embodiment makes provision for mutually opposing end portions of the transverse leaf spring with respect to a longitudinal extent of the transverse leaf spring to be at least indirectly connected to one of the transverse links or one of the wheel-carriers. For example, the end portions may each be indirectly connected by means of a coupling element, in particular a link, to one of the transverse links or one of the wheel-carriers. By means of an articulated connection of such a coupling element, variations of the length of the transverse leaf spring during deflection and release operations can be absorbed. If the transverse leaf spring is additionally fixed via the above-mentioned securing units to the vehicle structure or auxiliary frame, the transverse leaf spring can be referred to as a 4-point bending bar. If the rear wheels are deflected or rebound at the same time during travel operation of the motor vehicle, the transverse leaf spring in each case assumes a C-shaped position. In the case of opposed resilient movements of the rear wheels, the transverse leaf spring takes up an S-shape. The geometry of the transverse leaf spring and the positions of the securing units relative to the transverse leaf spring and the positions of the connections of the end portions of the transverse leaf spring on the transverse links or wheel-carriers are parameters which can be selected and determined in an optimum manner in order to provide the desired suspension properties and desired rolling movements of the motor vehicle.

According to another advantageous embodiment, there is provision for the transverse leaf spring to be arranged with respect to a longitudinal vehicle direction in the vicinity of wheel rotation axes defined by the wheel-carriers and the end portions each to be connected at least indirectly to a respective upper transverse link which is arranged geodetically higher than the transverse leaf spring, or to the respective wheel-carrier. This embodiment of the multi-link rear suspension is particularly advantageous when used on a motor vehicle with front-wheel drive. With the arrangement of the transverse leaf spring with respect to the longitudinal vehicle direction in the vicinity of the wheel rotation axes defined by the wheel-carriers, an offset between the floor reaction force and the reaction force of the transverse leaf spring is limited, whereby the pretensioning of bearing bushes of the multi-link rear suspension can be reduced.

According to another advantageous embodiment, there is provision for the transverse leaf spring to be arranged in a longitudinal vehicle direction with respect to a forward travel direction of the motor vehicle behind wheel rotation axes defined by the wheel-carriers and for the end portions to be at least indirectly connected to a respective lower transverse link, which is arranged geodetically lower than the transverse leaf spring, or to the respective wheel-carrier. This embodiment of the multi-link rear suspension is particularly advantageous when used on a motor vehicle with rear-wheel drive.

Advantageously, the transverse leaf spring extends partially through a hollow transverse carrier of the auxiliary frame. The transverse leaf spring is thereby protected by the transverse carrier of the auxiliary frame from contact with objects which improves the durability of the multi-link rear suspension.

Another advantageous embodiment makes provision for the transverse leaf spring to be at least partially produced from a steel or a fiber composite material. The fiber composite material may, for example have fibers of glass, carbon, aramid or another material. Particularly when the transverse leaf spring is produced from a fiber composite material, the multi-link rear suspension affords a substantial weight reduction in comparison with a multi-link rear suspension with coil springs of steel and a stabilizer rod of steel According to another advantageous embodiment, the transverse leaf spring is constructed in a linear manner or the transverse leaf spring has a shape which is adapted to the available structural space. As a result of a specific geometric construction of the transverse leaf spring, it is further possible for any necessary free spaces to be provided for arrangement of other vehicle components.

The above object is further achieved as disclosed herein by a motor vehicle having the features of claim 9, in which the multi-link rear suspension is constructed in accordance with one of the above embodiments or any combination of at least two of these embodiments with each other.

The advantages which are mentioned above in relation to the multi-link rear suspension are accordingly connected with the motor vehicle. The motor vehicle may, for example, have front-wheel drive or rear-wheel drive.

Other advantageous embodiments of the invention are disclosed in the dependent claims and the following description of the Figures, in which:

DETAILED DESCRIPTION

Figure 1:
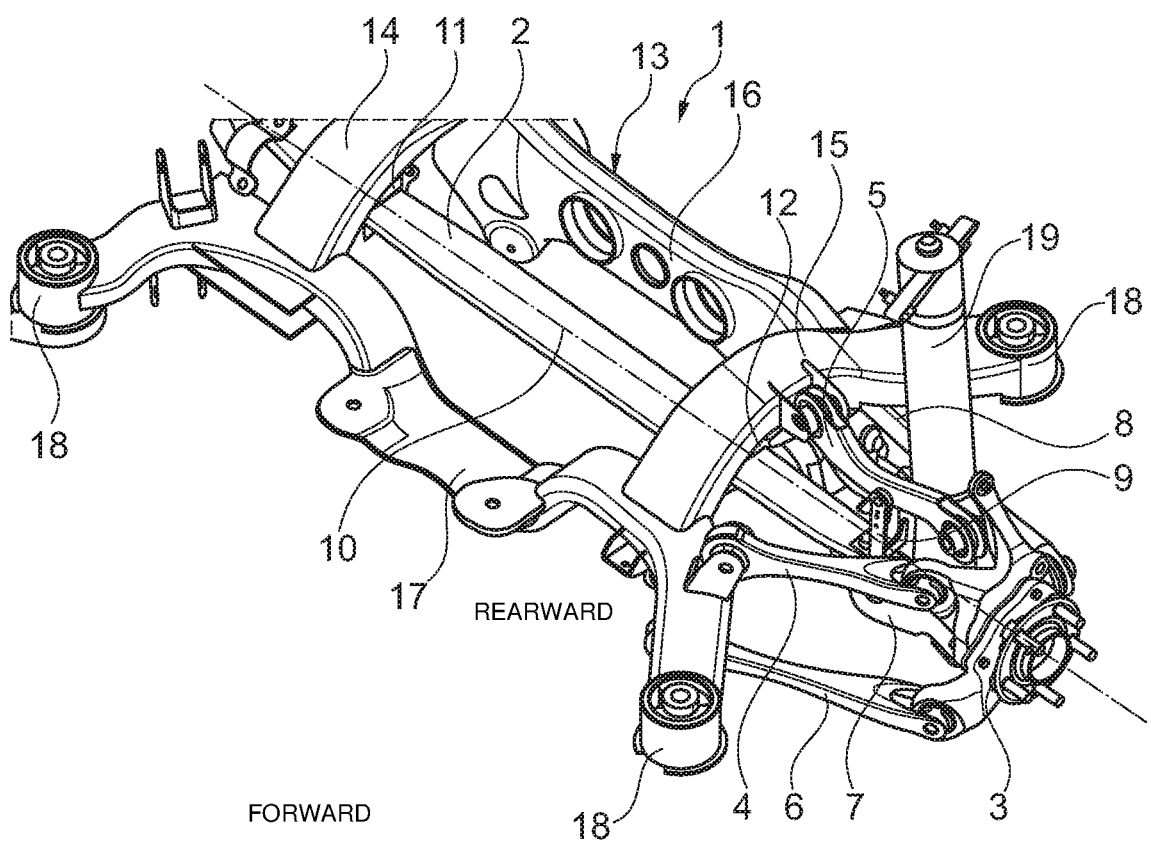
FIG. 1 is a schematic and perspective illustration of an embodiment of a multi-link rear suspension disclosed herein.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various figures, components which are identical are always provided with the same reference numerals, for which reason they are generally also only described once.

Figure 2:
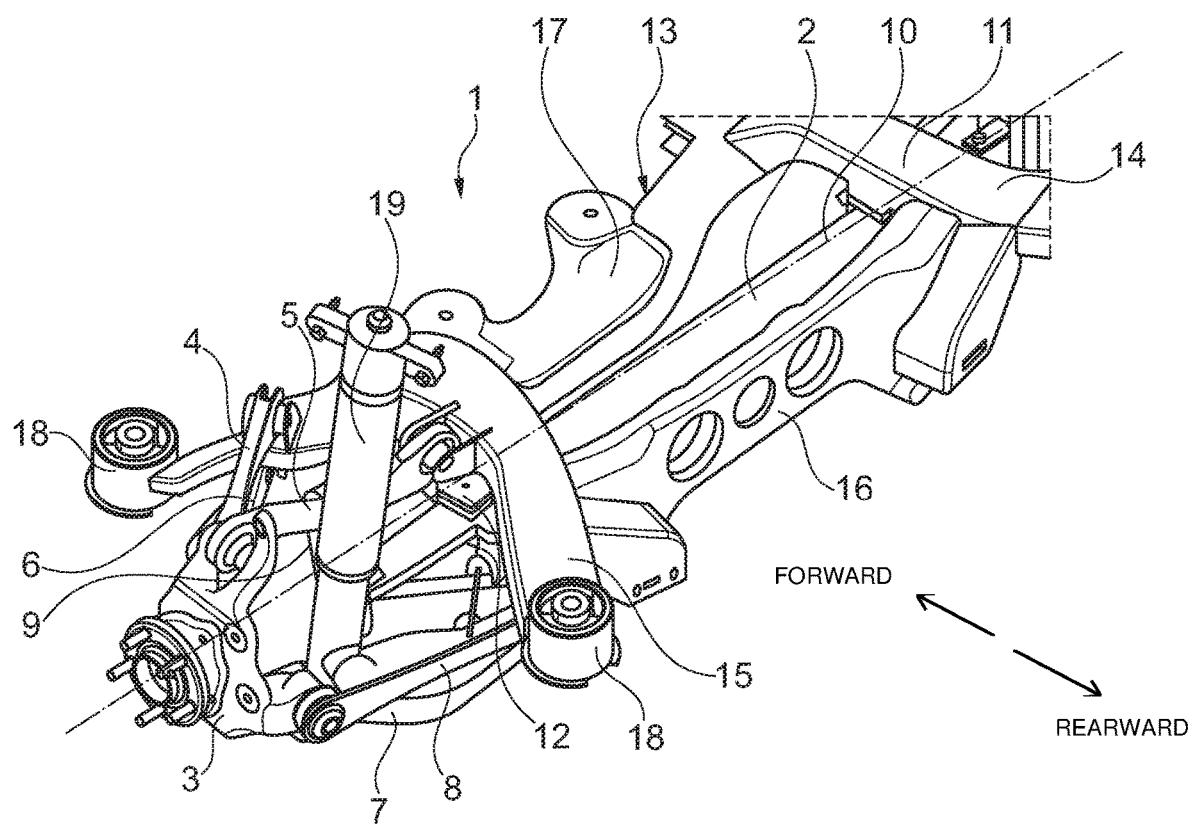
FIG. 2 is another schematic and perspective illustration of the multi-link rear suspension shown in FIG. 1.

FIGS. 1 and 2 are schematic and perspective illustrations of an embodiment of a multi-link rear suspension 1 for a motor vehicle, the majority of which is not shown. The motor vehicle may in particular be provided with a front-wheel drive. The figures omit the right end of the rear suspension, it being understood by persons of skill in the art that the suspension is substantially symmetric about a longitudinal centerline of the vehicle, with pertinent components being repeated on the right end of the suspension.

The multi-link rear suspension 1 has a transverse leaf spring 2 extending in the transverse vehicle direction and operatively acting on wheel-carriers 3 to cushion a vehicle structure (commonly referred to as the "sprung weight") of the motor vehicle with respect to the wheel-carriers 3 of the multi-link rear suspension 1, wherein the transverse leaf spring 2 also takes over the function of a stabilizer. The transverse leaf spring 2 may be produced partially or completely from a steel or a fiber composite material. The transverse leaf spring 2 may be substantially linear in configuration, as shown. Alternatively, the transverse leaf spring 2 may have a shape which is adapted to the structural space available.

Furthermore, the multi-link rear suspension 1 has exclusively transverse links 4-8 for guiding the wheel-carriers 3, that is to say, per wheel-carrier 3 a front-upper transverse link 4, a rear-upper transverse link 5, a front-lower transverse link 6, a rear-lower transverse link 7 and a rear-side or lateral transverse link 8 (toe link).

Opposite left and right end portions of the transverse leaf spring 2 (only the left end being depicted in FIGS. 1 and 2) are each connected indirectly to the respective rear-upper transverse link 5 via a coupling element 9. The respective coupling element 9 is connected at one end in an articulated manner to the transverse leaf spring 2 and, at an opposite end, to the respective rear-upper transverse link 5. The transverse leaf spring 2 is arranged, with respect to a longitudinal direction of the vehicle in approximate alignment with wheel rotation axes 10 defined by the wheel-carriers 3. In addition, the end portions of the transverse leaf spring 2 are each indirectly connected to the upper transverse link 5 which is arranged geodetically higher than the transverse leaf spring 2.

The multi-link rear suspension 1 has right and left securing units 11, 12 which engage the transverse leaf spring 2 at laterally-spaced locations and via which the transverse leaf spring 2 can be secured at two positions which are arranged symmetrically relative to a longitudinal vehicle center axis to an auxiliary frame 13 of the multi-link rear suspension 1, which frame 13 can be secured to the vehicle structure, or can at least be supported on the auxiliary frame 13 during a deflection operation. To this end, the auxiliary frame 13 has right and left longitudinal carriers 14, 15 on which the transverse leaf spring 2 can be supported via the respective securing unit 11, 12. The longitudinal carriers 14 and 15 are connected to each other by means of two transverse carriers 16 and 17 of the auxiliary frame 13. On each transverse carrier 16 or 17, there are arranged at the end side securing bushes 18 via which the auxiliary frame 13 can be secured to the vehicle structure.

Furthermore, the multi-link rear suspension 1 has per wheel-carrier 3 an oscillation damper 19 the lower end of which is supported on the rear-lower transverse link 7.

Figure 3:
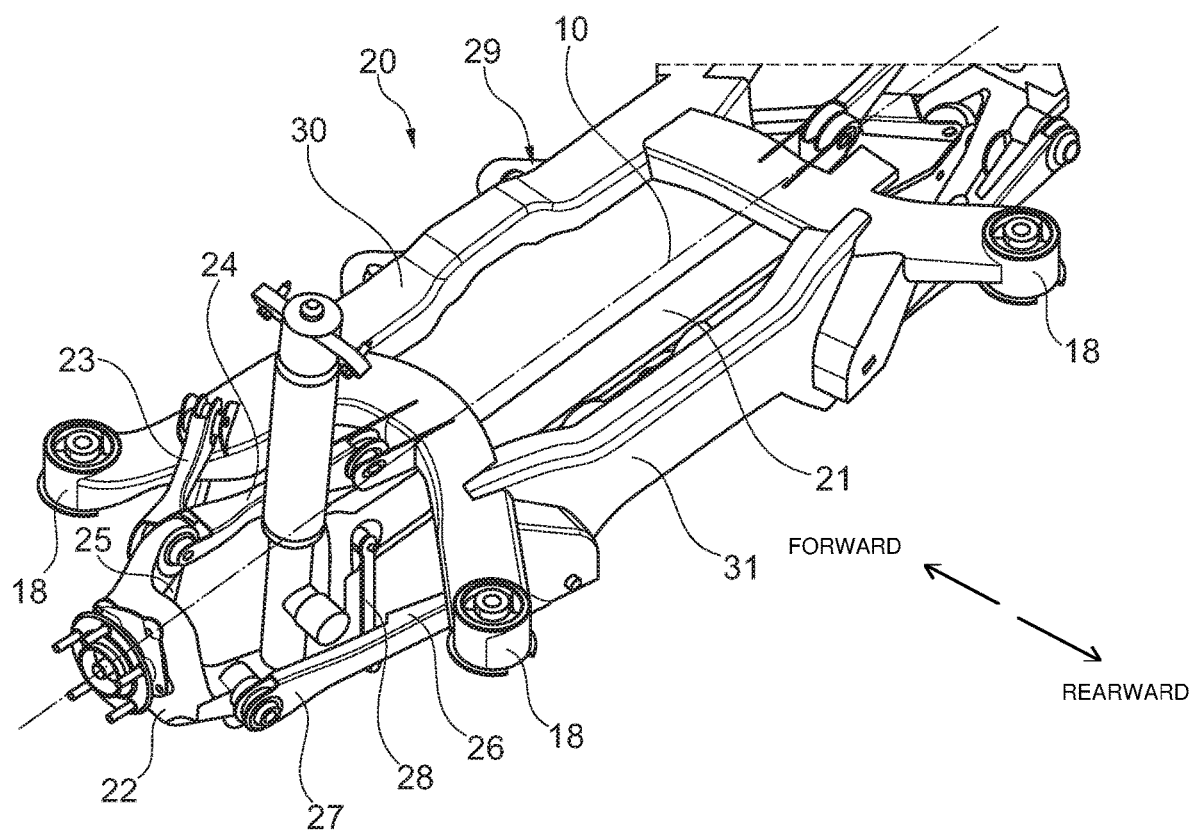
FIG. 3 is a schematic and perspective illustration of another embodiment of a multi-link rear suspension disclosed herein.

FIG. 3 is a schematic and perspective illustration of another embodiment of a multi-link rear suspension 20 for a motor vehicle, the majority of which is not shown. The motor vehicle may in particular be provided with rear-wheel drive.

The multi-link rear suspension 20 has a transverse leaf spring 21 which extends in the transverse direction of the vehicle exclusively for cushioning a vehicle structure of the motor vehicle with respect to wheel-carriers 22 of the multi-link rear suspension 20, wherein the transverse leaf spring 21 also takes up the stabilizer function. The transverse leaf spring 21 may be partially or completely produced from a steel or a fiber composite material. The transverse leaf spring 21 may be substantially linear in configuration. Alternatively, the transverse leaf spring 21 may have a shape which is adapted to the available structural space.

Furthermore, the multi-link rear suspension 20 has exclusively transverse links 23 to 27 for guiding the wheel-carriers 22, that is to say, per wheel-carrier 22 a front-upper transverse link 23, a rear-upper transverse link 24, a front-lower transverse link 25, a rear-lower transverse link 26 and a rear-side or lateral transverse link 27 (toe link).

Opposite left and right end portions of the transverse leaf spring 21 are each connected by means of a coupling element 28 indirectly to the respective rear-lower transverse link 26. The respective coupling element 28 is connected in an articulated manner to the transverse leaf spring 21 and the respective rear-lower transverse link 26. In particular, the transverse leaf spring 21 is arranged with respect to a forward travel direction of the motor vehicle behind wheel rotation axes 10 defined by the wheel-carriers 22. In addition, the end portions of the transverse leaf spring 21 are each connected indirectly to the lower transverse link 26 which is arranged geodetically lower than the transverse leaf spring 21.

Figure 4:
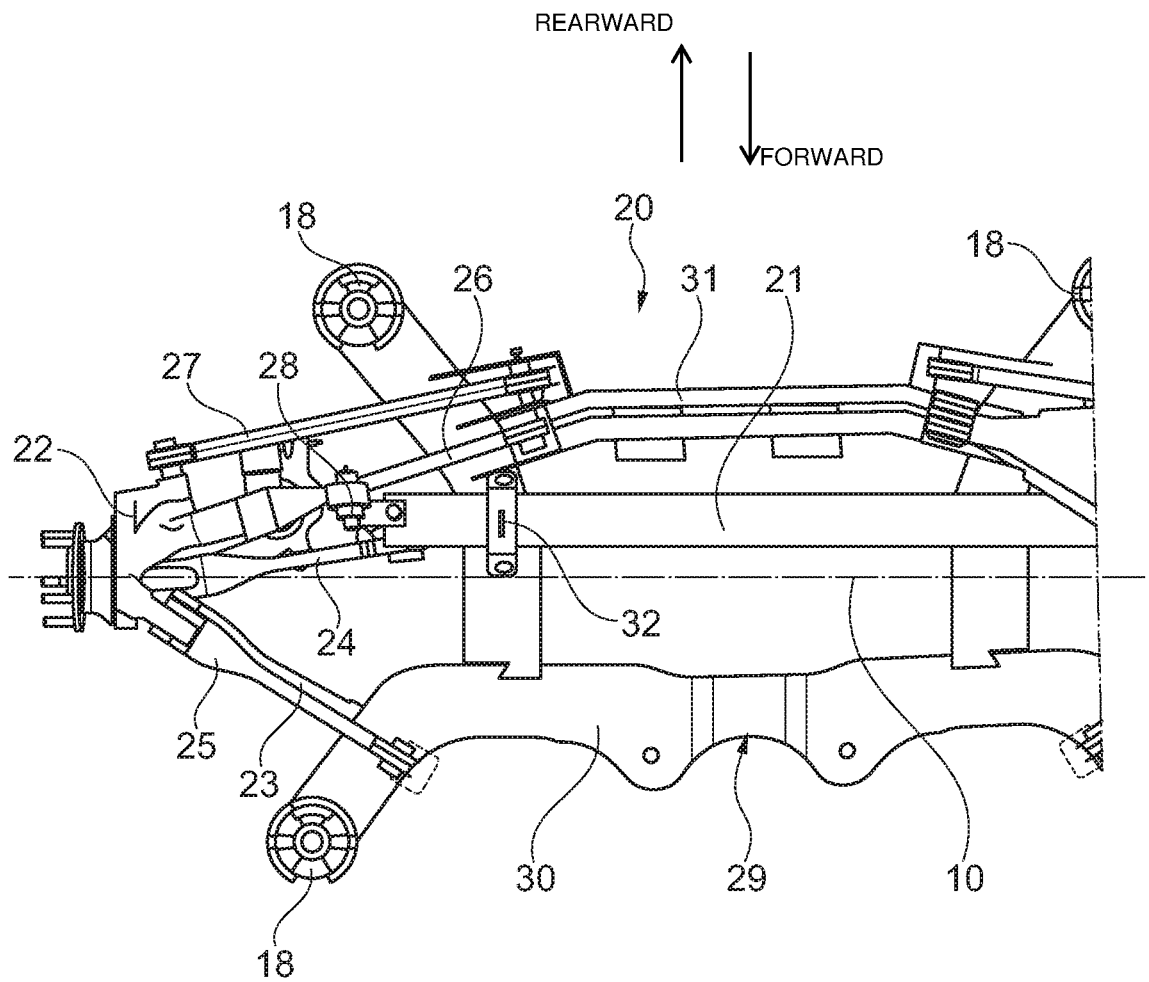
FIG. 4 is a schematic bottom view of the multi-link rear suspension shown in FIG. 3.

The multi-link rear suspension 20 has two securing units which engage in a manner spaced apart from each other on the transverse leaf spring 21 and which are shown in FIG. 4 and via which the transverse leaf spring 21 can be secured at two positions which are arranged symmetrically with respect to a longitudinal vehicle center axis to an auxiliary frame 29 of the multi-link rear suspension 20, which frame 29 can be secured to the vehicle structure, or can be supported on the auxiliary frame 29 at least during a deflection operation. To this end, the auxiliary frame 29 has two longitudinal carriers 14 and 15 on which the transverse leaf spring 21 can be supported via the respective securing unit. The longitudinal carriers 14 and 15 are connected to each other by means of two transverse carriers 30 and 31 of the auxiliary frame 29. On each transverse carrier 30 or 31, there are arranged at the end side securing bushes 18 via which the auxiliary frame 29 can be secured to the vehicle structure. The securing units may be constructed in accordance with the embodiment shown in FIGS. 1 and 2.

Furthermore, the multi-link rear suspension 20 has per wheel-carrier 22 an oscillation damper 19 which is supported at one side on the rear-lower transverse link 26.

FIG. 4 is a schematic bottom view of the multi-link rear suspension 20 shown in FIG. 3. There is shown one of the two securing units 32 via which the transverse leaf spring 21 can be supported on the longitudinal carrier 15 of the auxiliary frame 29 or is secured to the auxiliary frame 29.

Figure 5:
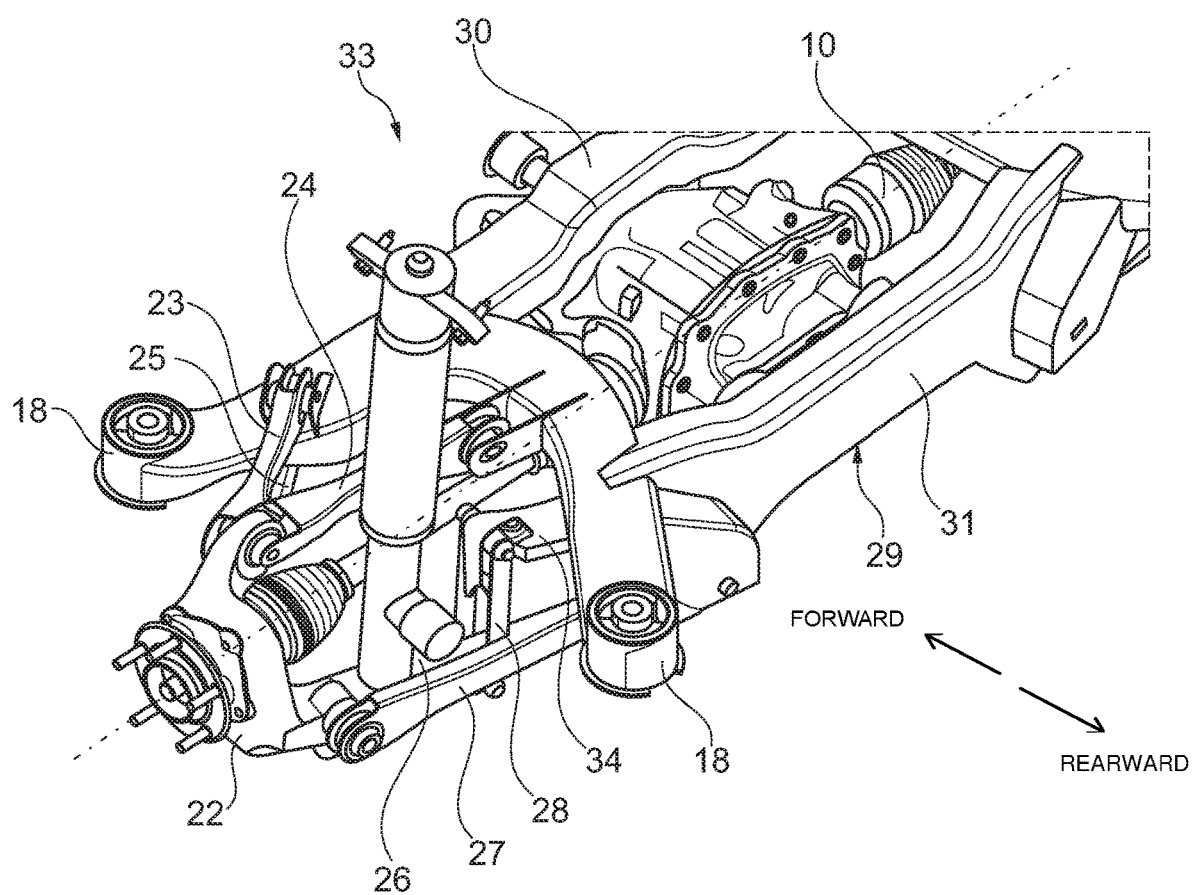
FIG. 5 is a schematic and perspective illustration of another embodiment of a multi-link rear suspension disclosed herein.

FIG. 5 is a schematic and perspective illustration of another embodiment of a multi-link rear suspension 33 disclosed herein for a motor vehicle which is not shown. The motor vehicle may in particular be provided with rear-wheel drive.

The multi-link rear suspension 33 differs in particular from the embodiment shown in FIGS. 3 and 4 in that the transverse leaf spring 34 is constructed in a curved manner and extends partially through the hollow rear-side transverse carrier 31 of the auxiliary frame. In order to prevent repetition, reference may further be made to the above description in relation to FIGS. 3 and 4.

Figure 6:
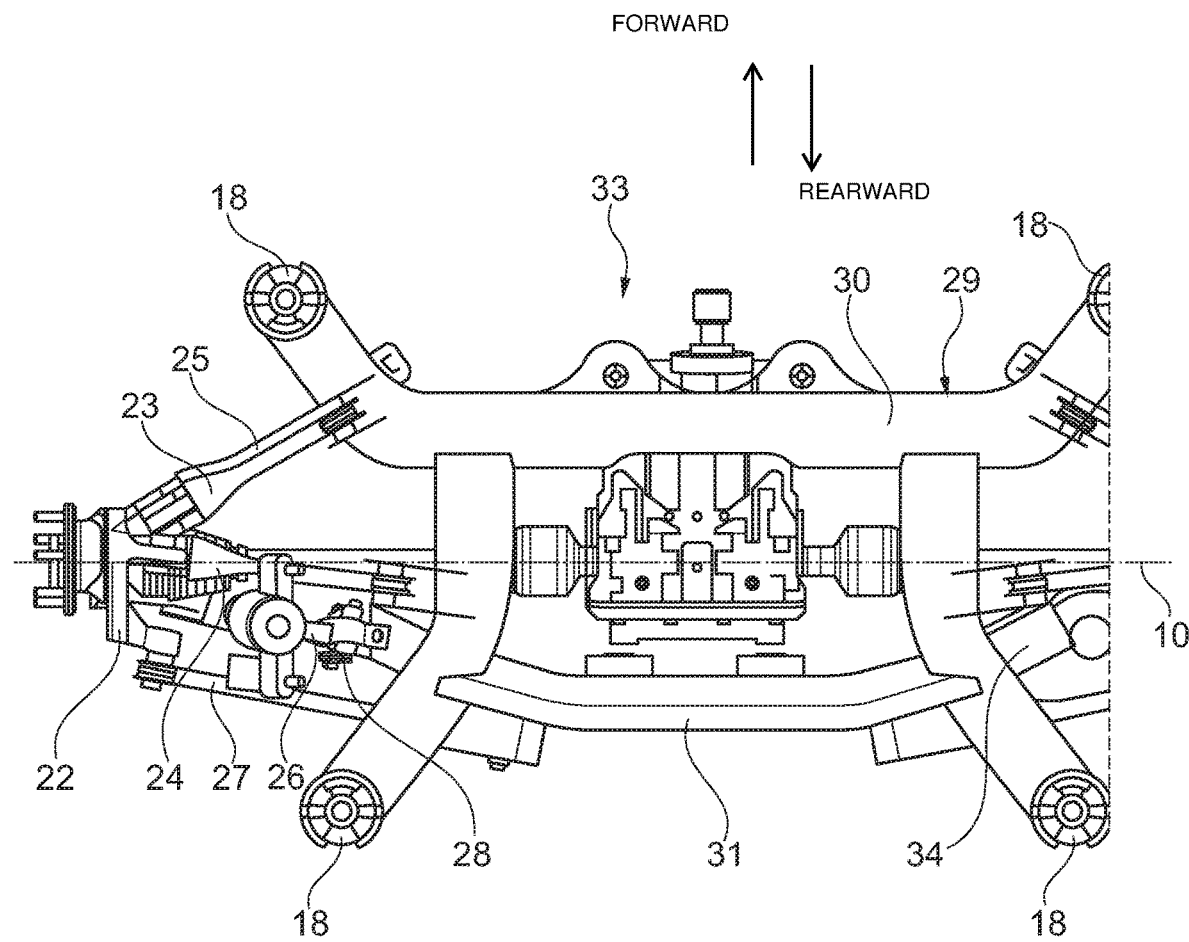
FIG. 6 is a schematic plan view of the multi-link rear suspension shown in FIG. 5.

FIG. 6 is a schematic plan view of the multi-link rear suspension 33 shown in FIG. 5. It is possible in particular to see the curved construction of the rear-side transverse carrier 31 and the transverse leaf spring 34.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A five-link motor vehicle suspension, comprising:
    a wheel-carrier movably mounted to a motor vehicle frame by a forward-upper transverse link, a rear-upper transverse link, a forward-lower transverse link, a rear-lower transverse link, and a toe link;
    a transverse leaf spring mounted to the frame and having an end acting on the wheel-carrier to cushion movement of the frame relative to the leaf spring; and
    a coupling element having a first end articulatingly connected to the leaf spring adjacent the end thereof and a second end articulatingly connected to one of the links.

2. The motor vehicle suspension of claim 1, wherein the coupling element is connected to at least one of the forward-upper transverse link and the rear-upper transverse link.

3. The motor vehicle suspension of claim 2, wherein the leaf spring is arranged, with respect to a longitudinal vehicle axis, in alignment with a wheel rotation axis defined by the wheel-carrier.

4. The motor vehicle suspension of claim 1, wherein the coupling element is connected to at least one of the forward-lower transverse link and the rear-lower transverse link.

5. The motor vehicle suspension of claim 4, wherein the leaf spring is arranged rearward of a wheel rotation axis defined by the wheel-carrier.

6. The motor vehicle suspension of claim 1, further comprising at least two securing units engaging the transverse leaf spring at laterally-spaced locations and securing the transverse leaf spring to the motor vehicle frame.

7. The motor vehicle suspension of claim 1, wherein the leaf spring extends through a hollow transverse carrier of the motor vehicle frame.

8. A five-link motor vehicle suspension, comprising:
    a wheel-carrier movably mounted to a motor vehicle frame by a forward-upper transverse link, a rear-upper transverse link, a forward-lower transverse link, a rear-lower transverse link, and a toe link;
    a transverse leaf spring mounted to the frame; and a coupling element having a first end articulatingly connected to the leaf spring adjacent an end thereof and a second end articulatingly connected to one of the links.

9. The motor vehicle suspension of claim 8, wherein the coupling element is connected to at least one of the forward-upper transverse link and the rear-upper transverse link.

10. The motor vehicle suspension of claim 9, wherein the leaf spring is arranged, with respect to a longitudinal vehicle axis, in alignment with a wheel rotation axis defined by the wheel-carrier.

11. The motor vehicle suspension of claim 8, wherein the coupling element is connected to at least one of the forward-lower transverse link and the rear-lower transverse link.

12. The motor vehicle suspension of claim 11, wherein the leaf spring is arranged rearward of a wheel rotation axis defined by the wheel-carrier.

13. The motor vehicle suspension of claim 8, further comprising at least two securing units engaging the transverse leaf spring at laterally-spaced locations and securing the transverse leaf spring to the motor vehicle frame.

14. The motor vehicle suspension of claim 8, wherein the leaf spring extends through a hollow transverse carrier of the motor vehicle frame.

* * * * *